United States Patent [19]

Byrne

[11] Patent Number: 5,041,002
[45] Date of Patent: Aug. 20, 1991

[54] EXTENDABLE ELECTRICAL JUNCTION ASSEMBLY

[76] Inventor: Norman R. Byrne, 2736 Honey Creek, N. E., Ada, Mich. 49301

[21] Appl. No.: 510,096

[22] Filed: Apr. 17, 1990

[51] Int. Cl.⁵ .............................................. H01R 25/06
[52] U.S. Cl. .................................... 439/215; 439/211
[58] Field of Search ................... 439/32, 33, 164, 210, 439/215

[56] References Cited

U.S. PATENT DOCUMENTS

| | | | |
|---|---|---|---|
| 2,362,481 | 11/1944 | Hartmann | 439/32 |
| 4,204,085 | 5/1980 | Chapman et al. | 439/33 X |
| 4,241,965 | 12/1980 | Wilson et al. | 339/4 |
| 4,579,403 | 4/1986 | Byrne | 439/33 |
| 4,762,072 | 8/1988 | Boundy et al. | 108/50 |
| 4,875,871 | 10/1989 | Booty et al. | 439/164 X |

Primary Examiner—Eugene F. Desmond
Attorney, Agent, or Firm—Varnum, Riddering, Schmidt & Howlett

[57] ABSTRACT

In an office environment using movable wall panels, electrical junction assemblies including conduits of adjustable length are disposed in raceways near the lower edge of the panels. One embodiment of an adjustable length electrical junction assembly comprises a telescoping conduit to accommodate wall panels of different dimensions and to facilitate the placement of electrical outlets at appropriate locations. One type of telescoping conduit comprises two overlapping conduit sections of generally rectangular cross section and forming an inner spatial area for retaining excess wiring in a safe position. Another type of telescoping conduit comprises a conduit section of generally rectangular cross section and a generally flat multi-wire cable extending into the rectangular cross section conduit section to allow for lengthwise adjustability of the assembly. In another embodiment, an extendable flexible conduit is connected to a rigid connector assembly provided with an inner spatial area to accommodate excess wiring to allow wiring to move into and out of the connector assembly by extension and retraction of the extendable flexible conduit. The connector assembly is arranged to provide an electrical power outlet at an appropriate location.

15 Claims, 10 Drawing Sheets

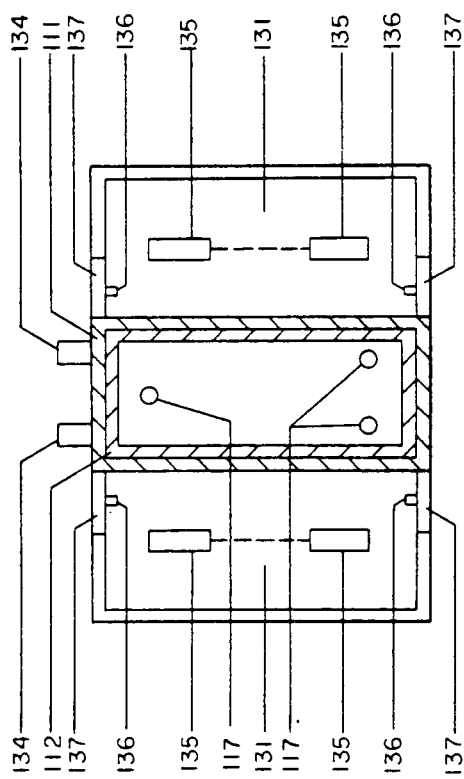
FIG. 2A
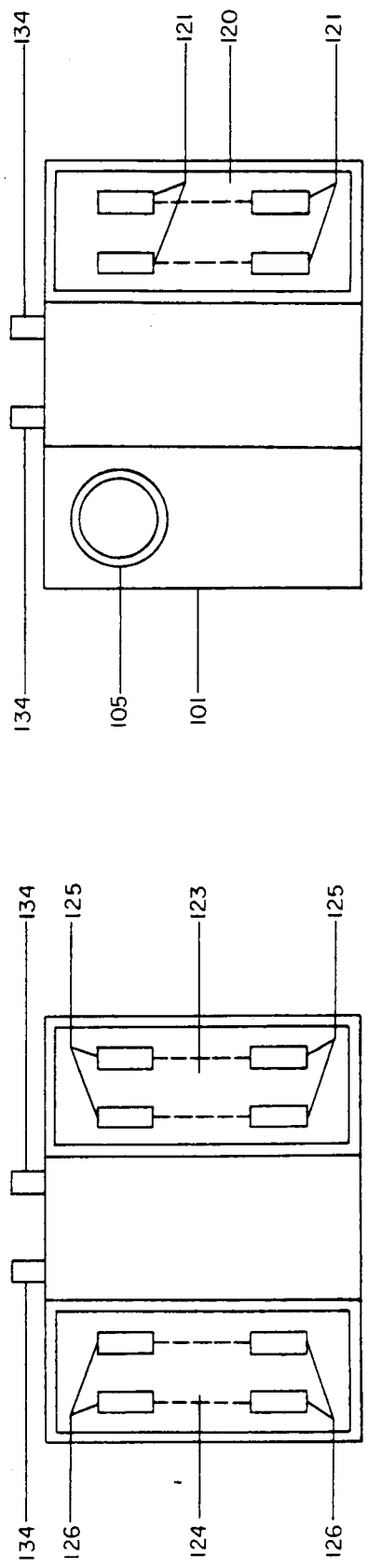
FIG. 2C
FIG. 2B

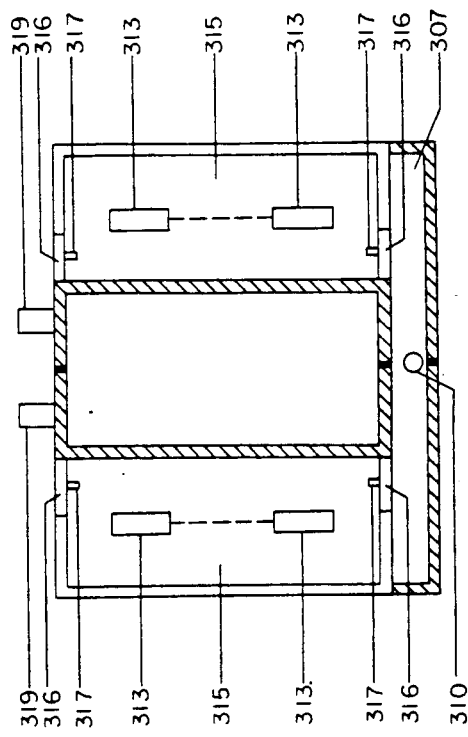
FIG. 6A
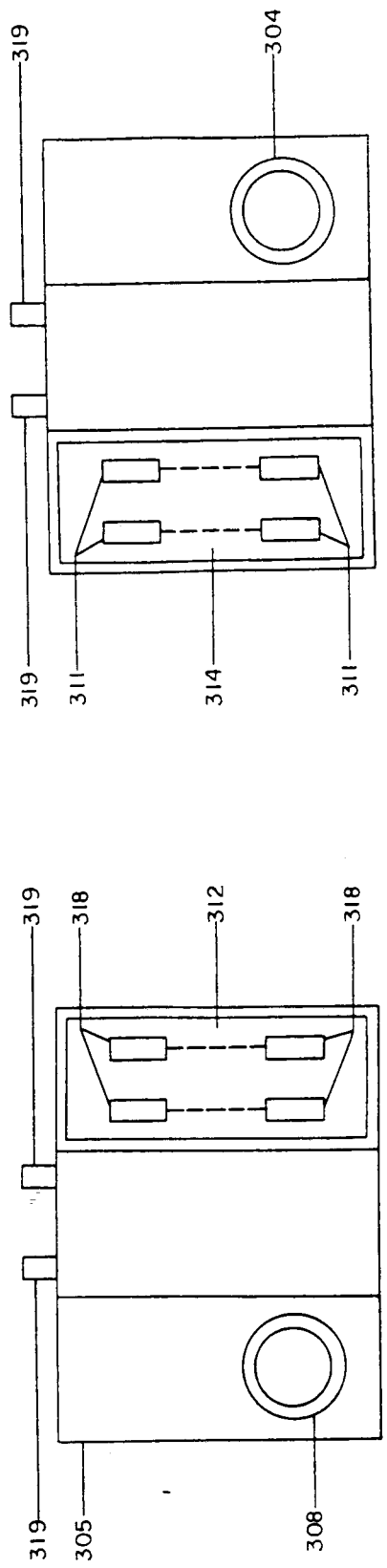
FIG. 6C
FIG. 6B

EXTENDABLE ELECTRICAL JUNCTION ASSEMBLY

BACKGROUND OF THE INVENTION

The invention relates to electrical connector assemblies, and more particularly to electrical connection assemblies having extendable electrical junction assemblies.

The modern office environment requires a number of electrical outlets to provide power to a variety of electrical devices such as typewriters, computers, telephone sets, dictation equipment and the like. Wall structures for office spaces are often formed from a plurality of prefabricated vertical wall panels which can be readily assembled or disassembled to rearrange space. As panels and office equipment are moved from one position to another, the need for electrical outlets in the different panels changes as well. Typically, such panels have a raceway near the bottom of the panel to accommodate electrical wiring, and the panels may comprise electrical connectors at their edges to allow electrical power to be propagated to various locations through electrical conductors in the raceways of adjacent panels. Electrical outlet boxes may be incorporated into the raceways as well. The panels generally vary in width to allow for flexible rearrangement of work space. It is usually too expensive to provide outlet boxes in every panel, and furthermore outlet boxes and junction assemblies must be attached at certain positions within the raceway where support brackets have been provided. Further, for the sake of safety, electrical conductors in the raceway are contained in rigid or flexible conduits or cables of a length corresponding to the distance between the connector blocks.

A primary problem exists with the prior art assemblies particularly when constructing or rearranging an office area in that cables of exact length are not readily available for every possible configuration and are difficult to make to exact length "in the field" in the installation process. Cables that are longer than the required length generally cannot be used because of the space restrictions within the raceway. There is thus a need for a lengthwise adjustable interconnecting arrangement which can be adjusted over a range of length to accommodate the needs of a variety of office and wall panel configurations.

An arrangement for an electrical junction assembly which provides for expansion and retraction of an electrical outlet or connector is disclosed in my prior patent, U.S. Pat. No. 4,579,403. The arrangement disclosed therein employs a flexible conduit which is extendable and retractable in the lengthwise direction. A housing is provided in which conductive wire is coiled or looped to provide additional wire length when the conduit is expanded and to provide an area for storing electrical wire when the conduit is retracted. One disadvantage of the prior art arrangement is that it requires a particular flexible conduit. Furthermore, such flexible conduit is limited in the expansion distance that can be obtained, which limited distance is directly related to the overall length of the conduit.

A general problem in construction of electrical junction assemblies for use in adjustable wall assemblies is the rather severe space constraints as well as the need to safely and neatly contain the wiring within raceways.

SUMMARY OF THE INVENTION

In accordance with the present invention, these and other problems of the prior art are solved by providing a telescoping conduit extending between two connector blocks for mounting in a raceway of a wall panel or the like. The telescoping conduit provides a path for wiring between the connectors, while providing a chamber area in the conduit in the retracted position or in any position between the retracted and expanded position for safely housing excess wiring. In one embodiment of the invention, a telescoping conduit comprises inner and outer overlapping sections of rectangular conduit slidingly engaged to provide an adjustable conduit of variable length in dependence on the amount of overlap of the two sections. Advantageously, one or both of the telescoping conduit members may be provided with electrical receptacles for receiving pluggable electrical outlet boxes to provide electrical power outlets at desired positions determined by extension or contraction of the telescoping conduit.

In another embodiment of the invention, a cable comprising a plurality of electrical wires engages a rectangular conduit in a telescoping relationship to provide a lengthwise adjustable assembly with excess wiring being safely stored in the rectangular conduit section.

In yet another embodiment of the invention, an extendable flexible conduit is connected to a rigid connector assembly comprising an inner spatial area for retaining excess wiring and a reduced width connector assembly area having opposing recesses to accommodate electrical outlet boxes and terminals for connection to the outlet boxes. Further, in accordance with this invention, the inner spatial area may be positioned on an opposite end of the reduced width section from the extendable conduit, and a passageway is provided to allow wiring to be slidably moved around the reduced width section containing the opposing recesses.

Advantageously, the telescoping conduit is inexpensive to manufacture and can readily be made to any size compatible with the size of the generally rectangularly-shaped raceway to retain a plurality of wires representing several electrical circuits in a neat and safe manner. The latter is of particular importance where several independent circuits are required to supply various electrical equipment connected at different positions.

BRIEF DESCRIPTION OF THE DRAWING

The invention may be better understood from the following detailed description when read in conjunction with the drawing in which:

FIG. 2A is a section taken along line 2a—2a of FIG. 2;

FIG. 2B is a right side elevation of the assembly of FIG. 2; FIG. 2C is a left side elevation of the assembly of FIG. 2;

FIG. 6A is a cross section of the assembly of FIG. 6 along the line 6a—6a;

FIG. 6B is a right side elevation of the assembly of FIG. 6; FIG. 6C is a left side elevation of the assembly of FIG. 6;

DETAILED DESCRIPTION

Figures 1, 1A:
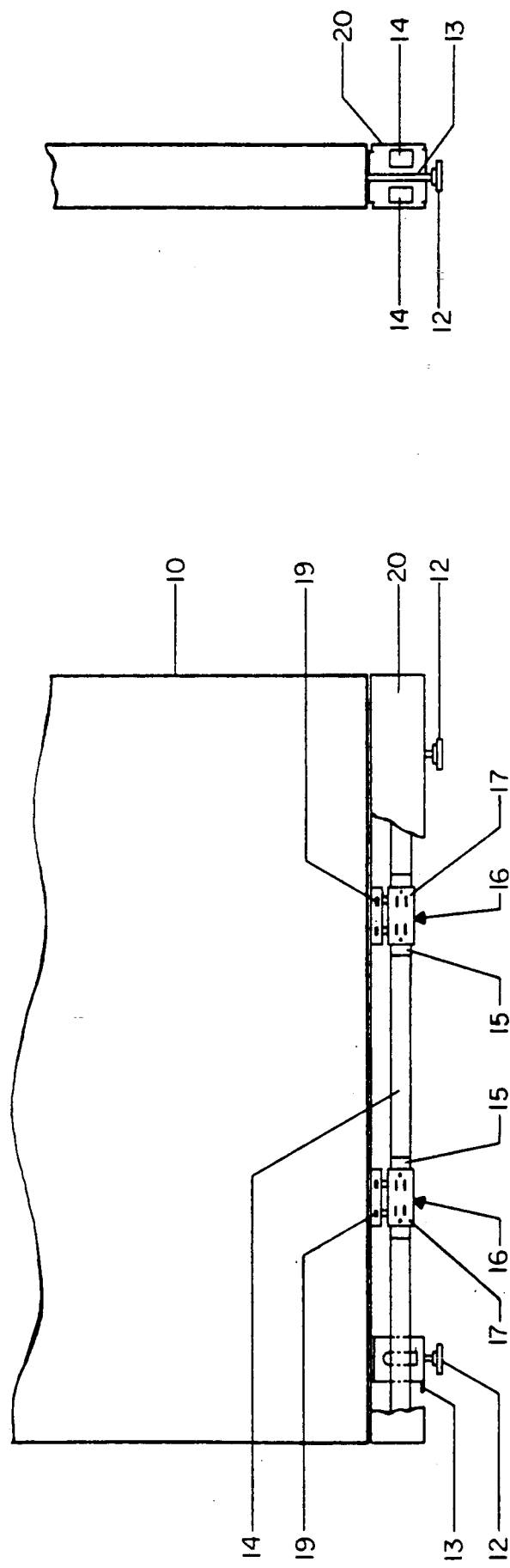
FIG. 1 shows a prior art arrangement of electrical outlet boxes and conduits in the raceway area of an interior vertical wall panel.
FIG. 1A is a side view of the raceway area of FIG. 1.

FIG. 1 shows a prior art arrangement of a portion of a wall panel 10 and an electrical junction assembly 14 attached in the raceway 20 at the lower end of the wall panel 10. The wall panel 10 is supported by adjustable legs 12, attached to support brackets 13. The support brackets and the electrical junction assembly are covered by a raceway cover 20, which is shown in cutaway view in FIG. 1. The junction assembly consists of a pair of terminal connector blocks 16 attached by screws or like fasteners to support brackets 19 extending from the lower portion of the wall 10. Preferably, the connector blocks 16 will include an electrical outlet box 17. Connector blocks 16 are interconnected by electrical wiring contained in a conduit 14 which is provided with connectors 15 to make connection with connector blocks 16. FIG. 1A is a side elevation of the raceway area showing a pair of conduits 14, of rectangular cross section, extending on either side of the support bracket 13.

Figure 2:
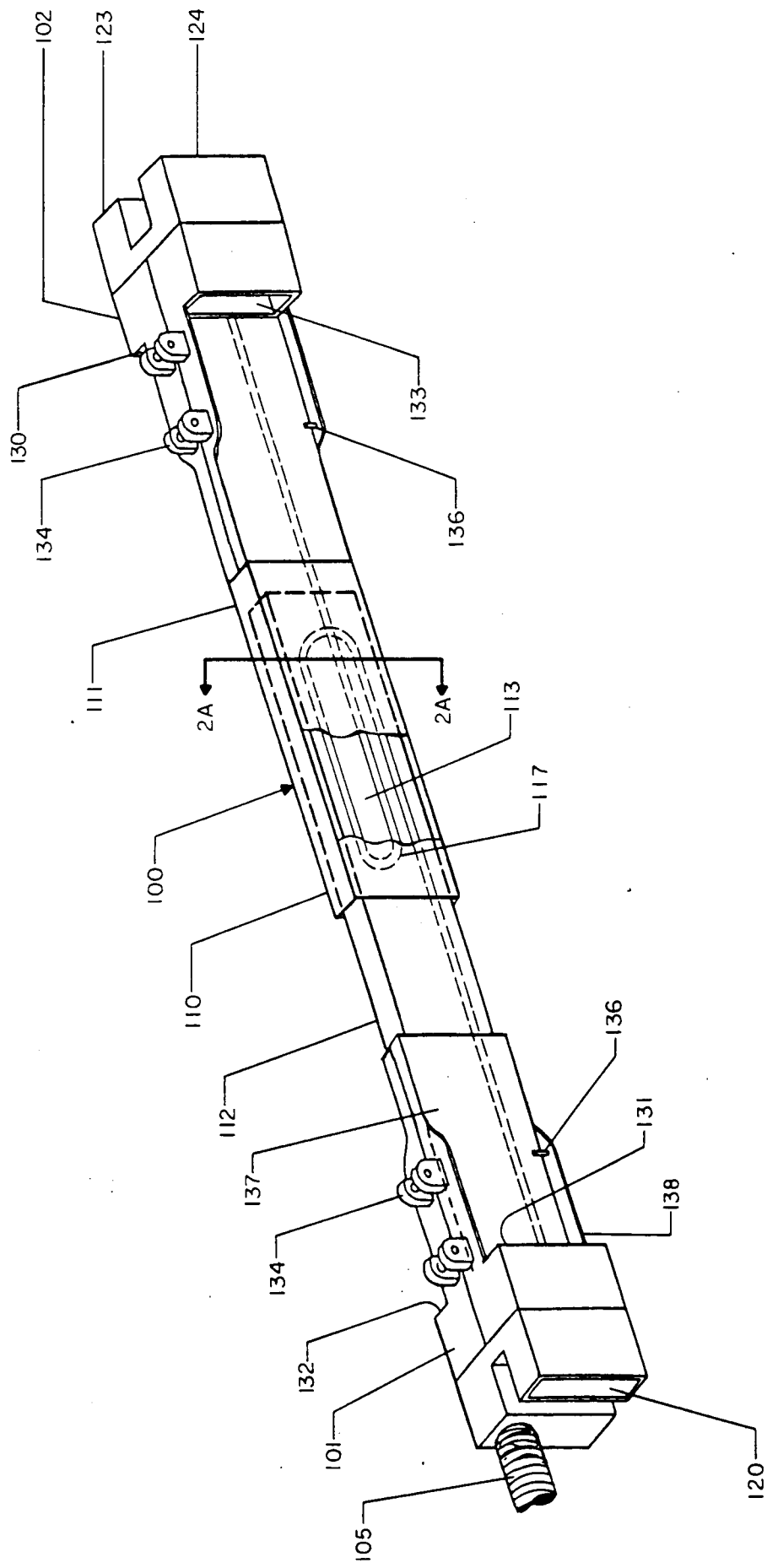
FIG. 2 is a perspective view of one embodiment of a telescoping electrical junction assembly, in accordance with the principles of this invention, for use in distributing power in interior wall panels of varying dimensions.

FIG. 2 represents one illustrative embodiment of the invention. FIG. 2 shows an electrical junction assembly 100 including a first connector block 101 and a second connector block 102. The electrical junction assembly 100 may be attached, for example, in a raceway of a wall panel, such as shown in FIG. 1 by means of lugs 134 on connector blocks 101 and 102. Electrical wires are connected to terminals in the connector blocks and are disposed in a telescoping conduit 110 having an outer telescoping section 111 and an inner telescoping section 112. The overall length of the conduit is adjustable by expanding and collapsing of the telescoping sections. Shown in a partial cutaway view in FIG. 2 is a section of electrical wiring extending between connector blocks 101 and 102 and which comprises a section of wire of sufficient length to provide the slack necessary to allow the telescoping conduit to be extended to a maximum length. As the conduit is collapsed, access wiring 117 is retained in an inner spatial area 113 formed by the overlapping conduits. The access wiring may be stored in area 113 in a looped or coiled fashion, as depicted in FIG. 2, or in a generally S-shaped overlapped position.

FIG. 2A shows a cross section of the overlapping conduit including in cross section a loop of a single wire or single cable 117 in inner spatial area 113. The conduit sections 111 and 112 are attached to plastic molded connector assemblies 101 and 102, respectively, in a standard well-known fashion. The connector assemblies 101 and 102 each incorporate a plurality of terminals for connection to the wires 117. The terminals are disposed in recessed areas such as the recessed area 120, having a plurality of electrical connection terminals 121. Terminals 121, shown in left side elevation in FIG. 2C, are for connection to electrical wiring in other conduits or flexible cable provided with a connector for engagement with terminals 121. The right side elevation of FIG. 2B shows similar receptacles 123 and 124 each having a plurality of terminals 125 and 126, respectively, for connection to other cables or conduit sections via appropriate connectors.

Figures 3, 3A:
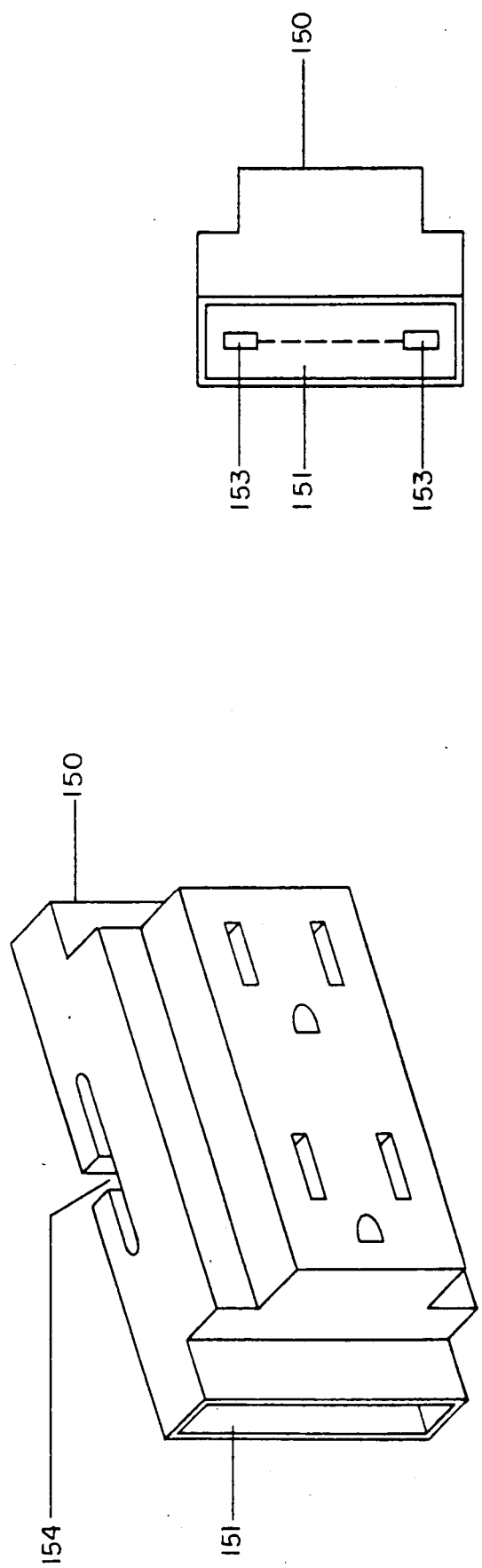
FIG. 3 is a perspective view of an electrical outlet box for use with a junction assembly as shown in FIG. 2.
FIG. 3A is a side elevation of the junction box of FIG.

Additional recesses 131 and 132 are provided in connector block 101 and similar recesses 130 and 133 are provided in connector block 102, as shown in FIG. 2. Recesses 131 through 134 are arranged to accept an electrical outlet block such as shown, for example, in FIG. 3. FIG. 2A shows terminals 135 in recesses 131 and 132. Terminals 135 are adapted to engage terminals provided in a recess 151 on one side of the outlet block 150 of FIG. 3. Terminals 153, displayed in the left side elevation of the outlet block 150, shown at FIG. 3A, are adapted to engage the terminals 135 shown in FIG. 2A. Flanges 137 and 138, shown in FIG. 2, are provided to give lateral support to the outlet block and guide pins such as pin 136, adapted to engage slots, such as slot 154 i the outlet block 150, maintain the outlet block 150 in position. FIG. 2 shows, a portion of a single wire or single cable 117 to illustrate a way of maintaining wires in the inner spatial area 113. A plurality of wires may be extended through the telescoping conduit 1100 and will at a minimum include three wires for an outlet block such as block 150 of FIG.3. A number of different circuits may be extended through the same conduit 110, however. For example, two different circuits may terminate on an outlet block such as outlet 150 if so desired. Furthermore, wires extending through the conduit 110 may terminate at terminals 1353 or may extend to other connector assemblies via cables or wires extending from terminals 125 and 126 in the recesses 123 and 124, respectively.

Figure 4:
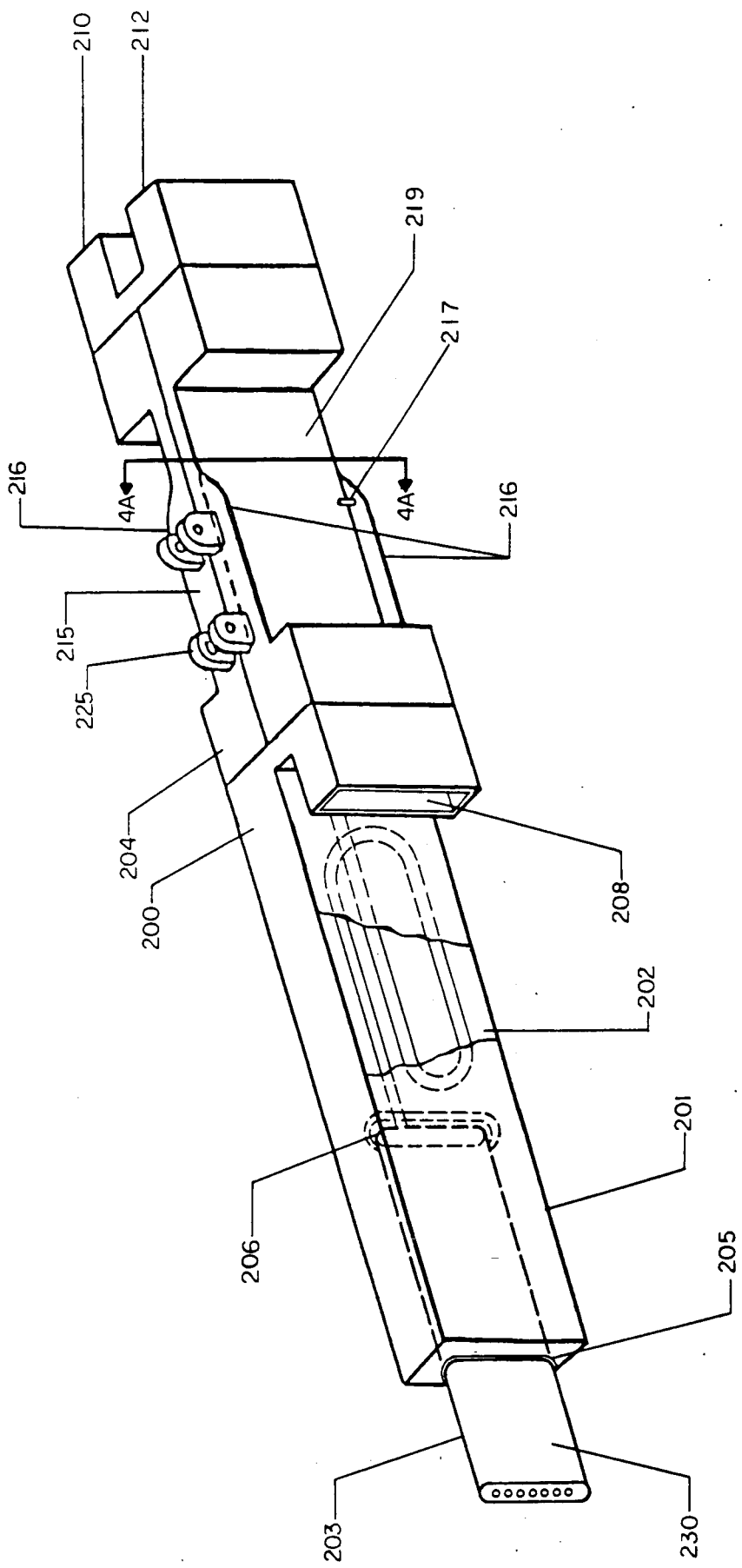
FIG. 4 is a perspective view of an alternate embodiment of the invention.
Figure 4B:
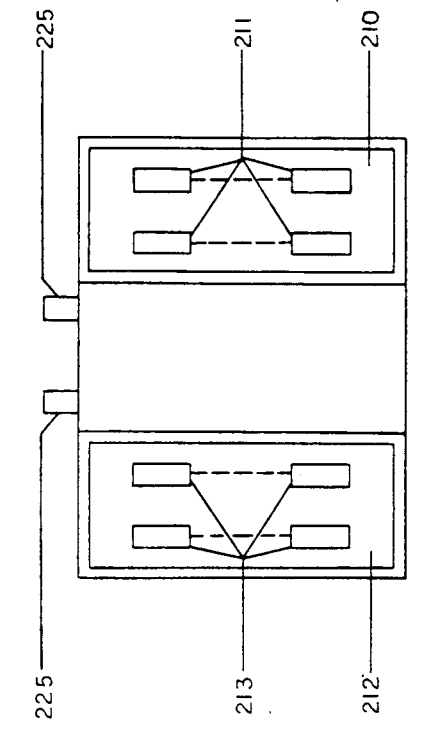
FIG. 4B is a right side elevation of the assembly of FIG. 4.
Figure 4D:
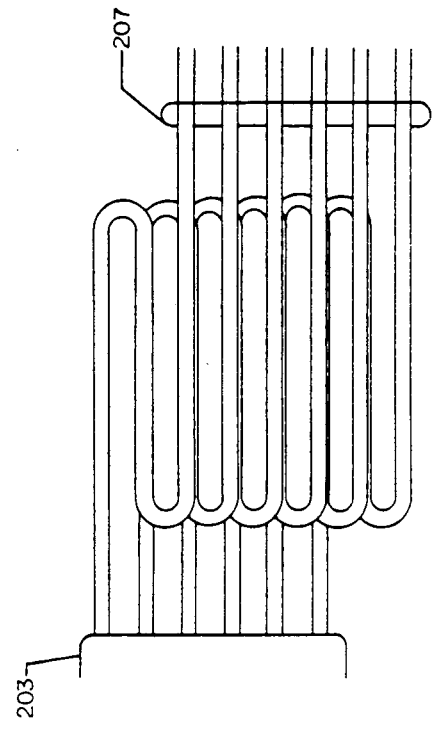
FIG. 4D depicts an alternate configuration for retaining wiring within the junction assembly of FIG. 4.

FIG. 4 represents an alternate embodiment of the invention in which a plastic molded connector assembly 200 comprises an elongated rectangular cross section housing 201 having an inner spatial area 202 for retaining electrical wiring and an opening 205 at one end of the housing for receiving a cable 203 in a telescoping relationship. The cable 203 may be any suitable cable, such as a commercially available, substantially flat, multiple wire insulated cable generally referred to as a festoon cable. The cable 203 is provided with an insulating outer jacket 230, and the opening 205 may be provided with a bearing surface made of a plastic material or the like to facilitate a sliding movement of the cable 203 in the opening 205. The cable 203 may be provided with a connector (not shown) at the one end of the cable opposite of the end extending into the spatial area 202. Electrical wires may extend from such a connector through the cable and extending beyond the end of insulating jacket 230 disposed in the spatial area 202. Individual wires of the cable extending beyond the end of jacket 230 are connected to terminals within the connector assembly 200. The length of the wires extending beyond the end of jacket 230 are selected of sufficient length to allow the cable 203 to be withdrawn from spatial area 202 to a position in which substantially all of the cable extends beyond the housing 201. A stop 206 ma be attached to the one end of the cable 230 disposed inside the spatial area 202 to prevent the cable from exiting the spatial area 202 through the opening 205. The spatial area 202 provides sufficient space for wiring to be stored therein when the cable 203 is moved into the spatial are 202. The cable may be contained in the spatial area 202 in a looped configuration as shown in FIG. 4. Alternatively, the wires may be contained in the spatial area 202, in an overlapped generally S-shaped configuration, as depicted in FIG. 4D.

Figure 4A:
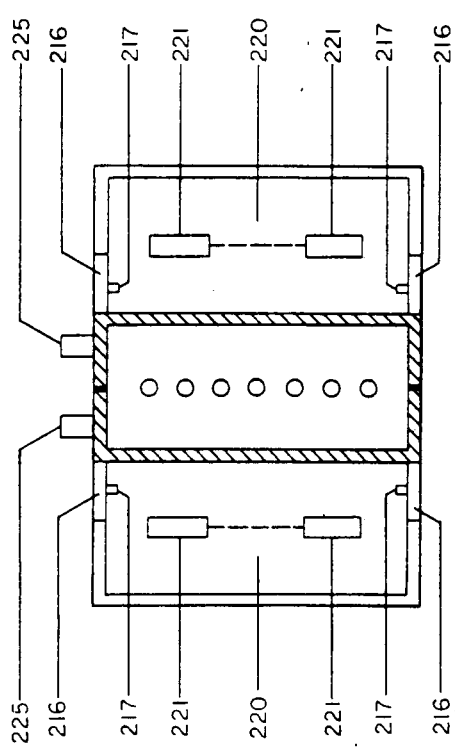
FIG. 4A is a cross section of the assembly of FIG. 4 along line 4a—4a of FIG. 4.
Figure 4C:
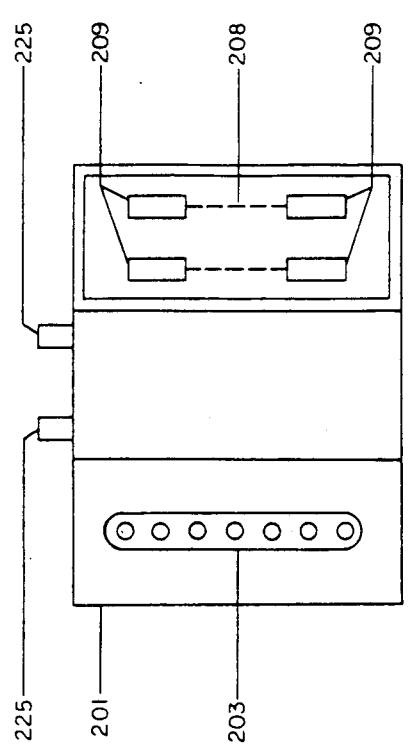
FIG. 4C is a left side elevation of the assembly of FIG. 4.

The connector assembly 200, at the end of the housing 201 opposite the opening 205, includes a receptacle 208 opening in a direction parallel to the housing 201, and including electrical connection terminals 209 as shown in a left side elevation of the assembly in FIG. 4C. The connector assembly 200 comprises a further pair of receptacles 210 and 212 opening in a direction opposite to recess 208. These receptacles include electrical terminals 211 and 213, respectively, as shown in a right side elevation in FIG. 4B. Receptacles 208, 210 and 212 may be engaged with conduits or the like via standard connectors.

The connector portion 204 of connector assembly 200 comprises a reduced cross-sectional area midsection 215 formed by opposing recessed areas 219. The areas are recessed and extended in the axial direction to accommodate an electrical outlet connector block of the type as shown, for example, in FIG. 3. FIG. 4A is a cross-sectional view of the reduced cross-sectional area midsection 215 along line 4A—4A of FIG. 4. Flanges 216, shown in FIG. 4 and 4A, are provided to support the outlet connector block, and pins 217 are provided to engage slots in the electrical outlet block 150, such as slots 154, shown in FIG. 3. Receptacles 220 are provided adjacent to the opposing recessed areas and provided with electrical terminals 221 for engagement with electrical terminals 153 of the outlet block 150 shown in FIGS. 3 and 3A. Lugs 225 are provided for attaching the connector assembly 200 to the bottom plate of a movable interior wall partition, as depicted in FIG. 1.

Figure 5:
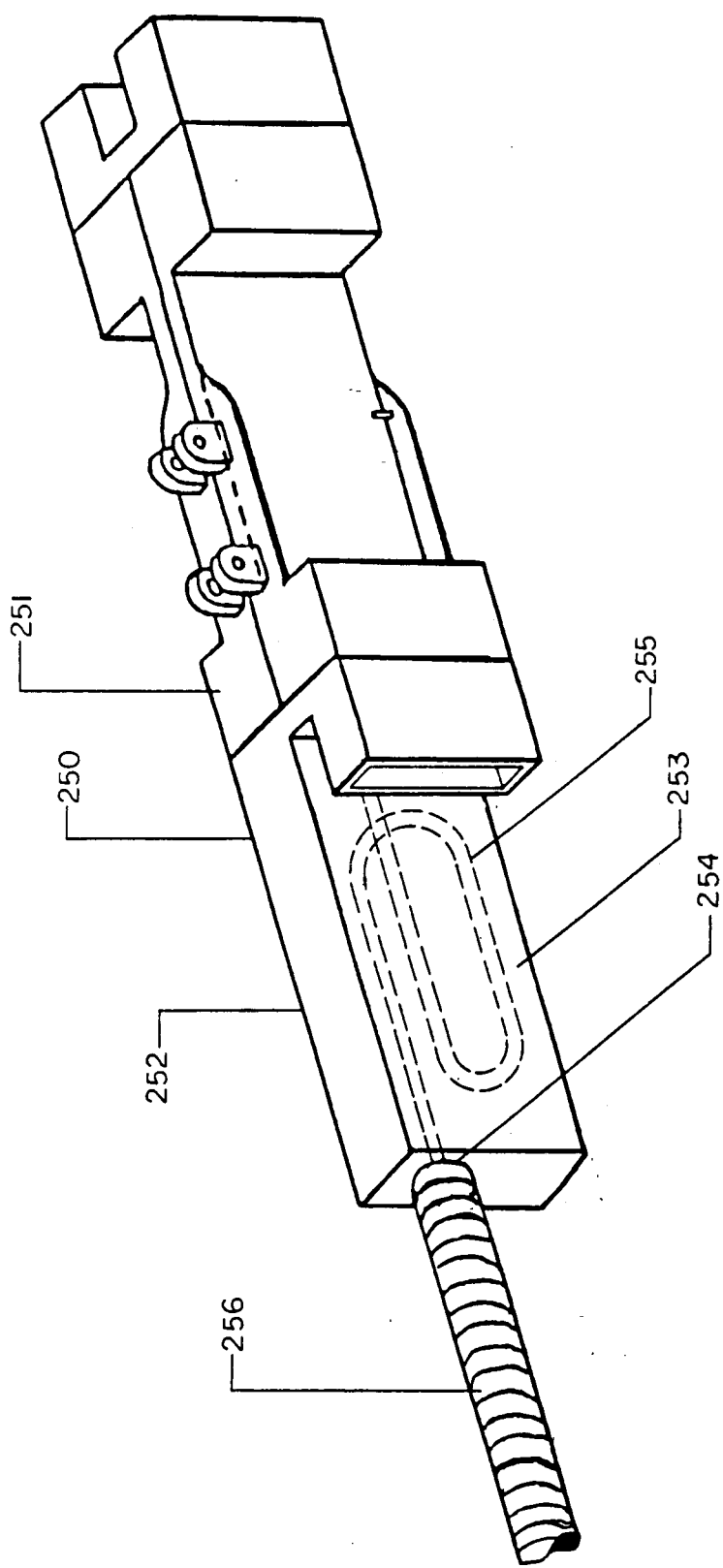
FIG. 5 is an electrical junction assembly in accordance with another embodiment of the invention.

FIG. 5 shows an electrical connector assembly 250 comprising a connector portion 251 and an elongated housing 252 of rectangular cross section. The connector portion 201 of the assembly is essentially identical to a corresponding connector portion 204 of the connector assembly 200 shown in FIG. 4, and does not need to be described in further detail herein. The housing 252 is provided with an inner spatial area 253 for retaining electrical wiring. An opening 254 in one end of the housing communicates with the inner spatial area and is adapted for receiving a flexible conduit 256 external to the housing. The flexible conduit is a commercially available conduit such as shown, for example, in FIG. 7, which may be expanded and compressed in its axial direction. Electrical wiring is disposed in the conduit and may be connected to a connector (not shown) at the end of the conduit opposite to the end of the conduit attached to the housing 252. Wires disposed in the conduit extend beyond the end of the conduit attached to the housing 252 and into the inner spatial area 253. The wires extend outwardly from the inner space into the connector portion 251, for connection to terminals internal to the connector portion 251. The electrical wires 255, which may be contained in a looped or overlapping configuration inside the inner spatial area 253, are of sufficient length to provide slack to allow the expandable conduit to be expanded to its full length. The inner spatial area 253 may be provided with a support assembly 257 as described, for example, in my prior U.S. Pat. No. 4,579,403 entitled "ELECTRICAL JUNCTION ASSEMBLY WITH ADJUSTABLE CONNECTORS", issued Apr. 1, 1986, to retain the cable in a looped or coiled configuration, but is not essential.

Figure 6:
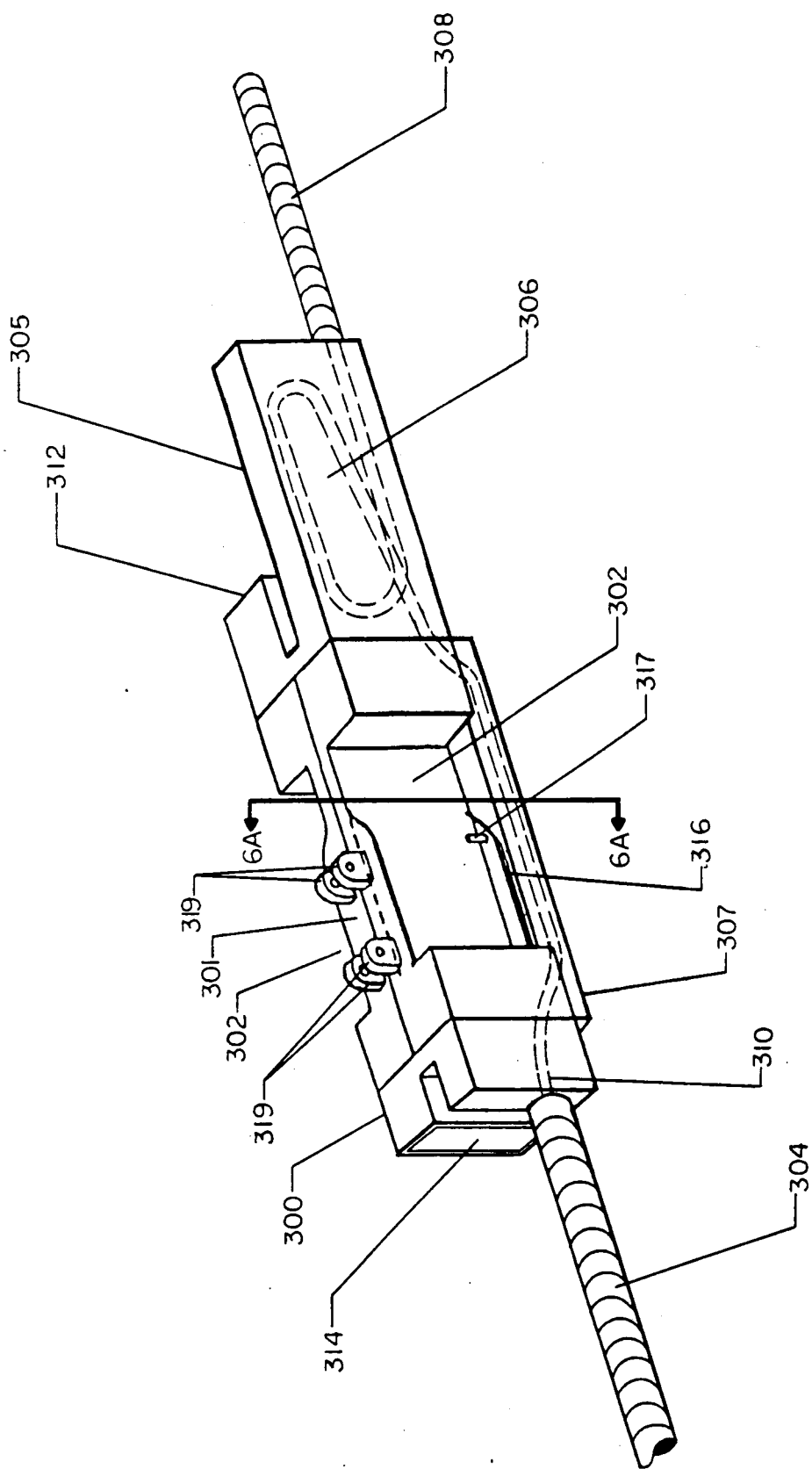
FIG. 6 is a perspective view of an electrical junction assembly in accordance with another embodiment of the invention.

Another embodiment of the invention is shown in FIG. 6. A connector assembly 300 comprises a reduced cross-sectional area midsection 3001 to provide opposing recessed areas 302 for containing electrical outlet blocks such as block 150 shown in FIG. 3. Connected to one end of the connector assembly 300 is a flexible conduit 304, of the type shown by way of example in FIG. 7, having electrical wires disposed therein which may be connected to a connector (not shown) at one end of the cable 304 opposite the end of attachment to the connector assembly 300. Formed at another end of the connector assembly 300 and as an integral part thereof is generally elongated housing 305 provided with an inner spatial area 306 for retaining electrical wiring. The housing 305 is positioned on an opposite end of the reduced cross section area 301 from flexible conduit 304 to accommodate installations which do not provide sufficient space for such a housing adjacent to the conduit end. A passageway 307 is provided adjacent the reduced cross-sectional area midsection 301 of the connector assembly 300 to provide a passageway between the conduit 304 and the housing 305. The passageway 307 has an opening near the end of the connector assembly 300 at which it is attached to the flexible conduit 304, and has another opening communicating with the inner spatial area 306. Electrical wiring disposed in the flexible conduit 304 extends inwardly into the connector assembly 300 and through the passageway 307 inwardly into the spatial area 306. The electrical wiring extends outwardly from the spatial area into another conduit 308 attached to the housing 305 at the end of the housing opposite the end of the housing attached to the connector assembly 300. Conduit 308 may be provided with a connector (not shown) at the end of the conduit 308 opposite the end connected to the housing 305. The conduit 308 may be a flexible conduit which may be extended and contracted in the same manner as conduit 304 or a rigid, nonexpandable conduit. Electrical wiring is retained in the inner spatial area 306 in a coiled or looped configuration or in a generally S-shaped overlapping configuration, and of sufficient length to allow conduits 304 and 308 to be expanded to their full length. The channel 307 allows for free travel of the wire 305 between the inner spatial area 306 and conduit 304.

FIG. 6A presents a cross-sectional view along the line 6a—6a of FIG. 6. FIG. 6A shows a pair of recesses 315 at one end of each of the opposing recessed areas 302 having a plurality of terminals 313 for engagement with terminals of an electrical outlet block contained within the recesses 302, such as terminals 153 of electrical outlet block 150 shown in FIG. 3. Flanges 316 and pins 317 are provided to support the electrical outlet blocks within the recesses. A single wire 310 is shown in cross section in the passageway 307. Lugs 319 are provided to attach the connector assembly 300 within a raceway of a wall panel or the like. FIG. 6B is a right side elevation of the assembly 300 and shows a recess 312 for receiving a conduit connector or the like and including terminals 318 for engagement with terminals of such a connector. Similarly, FIG. 6C, a left side elevation of the assembly of FIG. 6, shows recess 314 for engagement of a conduit connector or the like and terminals 311 for engagement with terminals of such a connector.

Figure 7B:
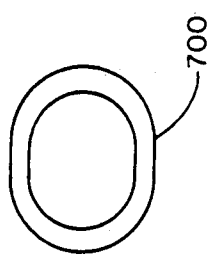
FIG. 7B is an end elevation of the conduit of FIG. 7.
Figure 7:
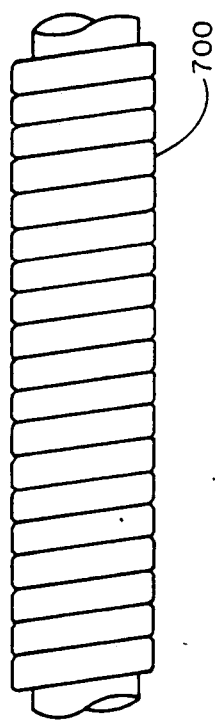
FIG. 7 is a side elevation of a flexible conduit for use with an electrical junction assembly in accordance with the invention.
Figure 7A:
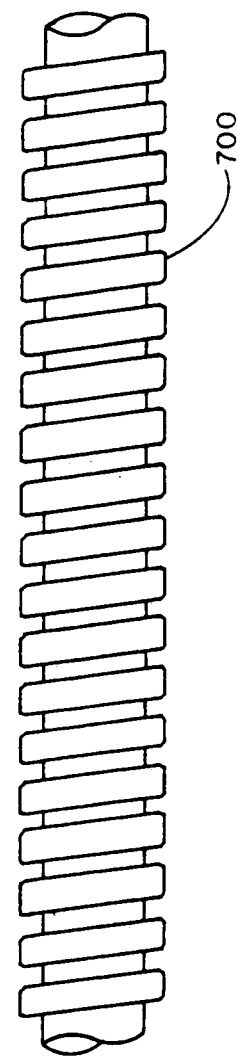
FIG. 7A is a side elevation of the conduit of FIG. 7 in an expanded state.

The flexible conduit used in the various embodiments disclosed herein may be any of a number of commercially available expandable conduits. FIG. 7 shows a particular kind of expandable flexible conduit 700 having a generally oval-shaped cross section, as shown in FIG. 7B. FIG. 7 shows the conduit 700 in its compressed position, and FIG. 7A shows the conduit 700 in an expanded position. By way of example, a section of conduit of approximately 10 inches in length in its compressed position may be expanded to approximately 12 inches in its expanded position. The expandable conduits shown in FIGS. 2, 5 and 6 may, for example, be the flat oval conduit of FIG. 7. The flat oval conduit, which is a commercially available conduit, has an advantage in use in distributing electrical wires within raceways of vertical wall panels in that more individual wires can be carried in such a conduit than a rounded conduit in the limited space provided within the raceways. The flat oval flexible conduit, generally shaped to comply with the essentially rectangular space in the raceways, may be readily curved in a horizontal plane to accommodate transitions between wall panels at angular positions to each other.

It will be understood that the embodiments described herein are only illustrative of the principles of the invention and that numerous other arrangements may be devised by those skilled in the art without departing from the spirit and scope of this invention.

What is claimed is:

1. An adjustable electrical junction assembly for use in distributing electrical power in interior wall panels, comprising:
   first and second elongated conduit members, each having one end slidably engaged in a telescoping manner with an end of the other member and adjustable in an axial direction to provide a telescoping conduit of variable length from a fully collapsed to a fully extended position, said conduit members having correspondingly-shaped rectangular cross sections wherein the walls of said telescoping conduit members form an inner spatial area dimensioned to accommodate excess length electrical wire conductors therein in an overlapping manner;
   said first conduit member having an electrical connector block attached thereto at one end of said first conduit member opposite said one end engaging said second conduit member, said connector block comprising electrical terminals for connection to electrical wire conductors disposed internal to said telescoping conduit members and electrical wire conductors disposed external to said telescoping conduit members; and
   an electrical cable rigidly attached to said second conduit member at said one end of said second conduit member opposite said one end engaging said first conduits member and at least one electrical wire conductor disposed within said cable, said wire conductor extending inwardly into said inner spatial area and extending outwardly from said spatial area to said connector block attached to said first conduit member for connection to at least one terminal of said connector block;
   said electrical conductor wire comprising a section of wire retained within said inner spatial area, said section of wire comprising wire of sufficient length to allow movement of said telescoping conduit between a fully extended and a fully collapsed position.

2. The junction assembly in accordance with claim 1, wherein said first and second conduit members comprise aluminum extrusions.

3. An electrical junction assembly for use in distributing electrical power in interior wall panels, comprising:
   first and second elongated conduit members, each having one end slidably engaged in a telescoping manner with an end of the other member and adjustable in an axial direction to provide a conduit of variable length from a fully collapsed to a fully extended position, said conduit members having correspondingly-shaped rectangular cross sections wherein the walls of said telescoping conduit members form an inner spatial area for housing electrical wire conductors therein;
   said first conduit member having an electrical connector block attached thereto oat one end of said first conduit member opposite said one end engaging said second conduit member, said connector block comprising electrical terminals for connection to electrical wire conductors disposed internal to said telescoping conduit members and an electrical receptacle formed as an integral part of said connector block and disposed along one side of said first conduit member, said receptacle having an opening extending in the direction of said second conduit member for receiving a pluggable electrical unit;
   an electrical cable attached to said second conduit member at said one end of said second conduit member opposite said one end engaging said first conduit member and at least one electrical wire conductor disposed within said cable, said wire conductor extending inwardly into said inner spatial area and extending outwardly from said spatial area to said connector block attached to said first conduit member for connection to at least one terminal of said connector block;
   said electrical conductor wire comprising a section of wire retained within said inner spatial area, said section of wire comprising wire of sufficient length to allow movement of said telescoping conduit between a fully extended and a fully collapsed position; and
   pluggable electric outlet box means having on one side thereof electrical terminals for pluggable engaging said receptacle and having a back surface facing toward said first conduit member when said outlet box is engaged in said receptacle and a front surface facing away from said first conduit member when said outlet box is engaged in said receptacle, and at least one electrical power outlet in said front surface for connection to electrical power consumption apparatus.

4. The electrical junction assembly in accordance with claim 2, wherein said second conduit member comprises:

an electrical connector block attached at said one end opposite said one end of said second conduit member engaging said first conduit member comprising another electrical receptacle formed as an integral part of said connector block of said second conduit member and having an opening extending in the direction of said first conduit member for receiving a pluggable electrical unit; and a pluggable, elongated electrical outlet box having on one side thereof electrical terminals for pluggable engaging said receptacle of said connector of said second conduit member and having a back surface facing toward said second conduit member when said other electrical outlet box is engaged with said other receptacle and a front face facing away from said second conduit member when said other electrical box is in engagement with said other receptacle, and at least one electrical outlet on said front surface of said other electrical box for connection to electrical power consumption apparatus.

5. An adjustable electrical junction assembly for use in distributing electrical power comprising, in combination:

an elongated housing of generally rectangular cross section having an inner spatial area, an opening at one end of said housing communicating with said inner spatial area, and at least one electrical connection terminal at another end of said housing; and an electrical cable telescopically engaging said elongated housing, a portion of said cable slidably engaging said opening and extending inwardly into said spatial area, said cable having one end disposed in said inner spatial area and having another end generally extending in a direction away from said housing;

said cable comprising at least one electrical conductive wire extending beyond said one end of said cable inwardly into said spatial area and outwardly from said spatial area to said at least one terminal to provide a conductive and continuous wire electrical path between said cable and said least one terminal;

said at least one wire comprising a section of excess length wire retained within said spatial area and having a length sufficient too allow said one end of said cable to be slidably withdrawn from said spatial area to a position in which only a predetermined length of said cable is extending into said spatial area.

6. The junction assembly in accordance with claim 5, wherein said section of excess length wire is maintained within said spatial area in a coiled or looped configuration.

7. The junction assembly in accordance with claim 5, wherein said section of excess length wire is maintained within said spatial area in an overlapped, generally S-shaped configuration.

8. The junction assembly in accordance with claim 5, wherein said cable has a generally flat cross section and said opening is formed to conform to said cross section of said cable.

9. The assembly in accordance with claim 8, wherein said one end of said cable comprises stop member for preventing said cable from exiting said spatial area.

10. An adjustable electrical junction assembly for use in distributing electrical power comprising, in combination:

a generally rectangularly-shaped, elongated housing having an inner spatial area, an opening at one end of said housing communicating with said spatial area and electrical connection terminal means at another end of said housing;

a flexible conduit having one end connected to said one end of said housing and extending outwardly from said housing, said flexible conduit being adjustable in axial length of a predetermined distance for a specified measure of conduit length; and conductive wire means disposed in said conduit and fixedly attached at another end of said conduit opposite said end attached to said housing, said conductive wire means extending inwardly into said opening and said spatial area and outwardly from said spatial area to said electrical connection terminal means;

said conductive wiring means comprising a section of excess length wires retained within said spatial area and having a length sufficient to provide slack for full extension of said conductive wire section relative to said opening in the form of linear movement of the wire means in correspondence to extension and retraction of the adjustable axial length of said flexible conduit;

said electrical connection terminal means comprising a generally elongated rectangular housing of a predetermined width and length, said housing having a reduced cross-sectional area midsection along its axial direction to form a recess on at least one side of said housing, and a receptacle at one end of said recess including receptacle terminals, said receptacle for receiving a portion of an electrical outlet box having outlet box terminals for engagement with said receptacle terminals, said recess dimensioned to contain said outlet box within said recess for engagement with said receptacle.

11. The junction assembly in accordance with claim 10, wherein said flexible conduit comprises a conduit of a substantially oval-shaped cross section.

12. An adjustable electrical junction assembly for use in distributing electrical power comprising, in combination:

an elongated generally rectangular cross section electrical connection terminal assembly; and a flexible conduit having one end connected to one end of said terminal assembly and extending outwardly therefrom, said flexible conduit being adjustable in axial direction between a retracted position and a fully extended position and constructed so as to provide a length adjustment of a predetermined distance for a specified measure of conduit length;

said terminal assembly further comprising an inner spatial area in another end of said terminal assembly opposite said one end of said terminal assembly, said terminal assembly comprising a reduced cross-sectional area midsection along its axial direction between said one end of said terminal block and said spatial area to form a recess for receiving an electrical outlet box, said recess comprising an electrical receptacle at one end thereof having electrical terminals for engagement with electrical terminals of an outlet box, said recess dimensioned to contain an outlet box within said recess;

conductive wire means disposed in said cable and fixedly attached at another end of said cable, said wire means extending from said cable inwardly into said inner spatial area, said conductive wire means comprising a section of excess length wires retained within said spatial area and having a length sufficient to provide slack for full extension of the conductive wire means in the form of linear movement of the wire means in correspondence to extension and retraction of the adjustable axial length of the flexible conduit;

said terminal assembly comprising a passageway adjacent said reduced cross-sectional area midsection and extending in the axial direction thereof and having openings communicating with said one end of said terminal assembly and with said inner spatial area to provide a passageway for said wire means around said reduced cross-sectional area midsection.

13. The junction assembly in accordance with claim 12, wherein said section of excess length wires is maintained in said spatial area in a coiled or looped configuration.

14. The junction assembly in accordance with claim 12, wherein said midsection comprises two opposing recesses for accommodating outlet boxes on opposing sides of said terminal assembly.

15. The junction assembly in accordance with claim 13, wherein said terminal assembly has a generally rectangular cross section having a greater dimension in one direction and said passageway is formed by expansion of said terminal assembly in said one direction in the vicinity of said midsection.

* * * * *

UNITED STATES PATENT AND TRADEMARK OFFICE
CERTIFICATE OF CORRECTION

PATENT NO. : 5,041,002

DATED : August 20, 1991

INVENTOR(S) : NORMAN R. BYRNE

It is certified that error appears in the above-identified patent and that said Letters Patent is hereby corrected as shown below:

Claim 1, column 7, line 67:
"conduits" should be --conduit--;

Claim 3, column 8, line 28:
"oat" should be --at--;

Claim 3, column 8, line 57:
"pluggable" should be --pluggably--;

Claim 4, column 8, line 67:
"claim 2" should be --claim 3--;

Claim 4, column 9, line 10:
"pluggable" should be --pluggably--;

Claim 5, column 9, line 42:
between "said" and "least" insert --at--;

Claim 5, column 9, line 46:
"too" should be --to--;

Claim 9, column 9, line 64:
before "stop" insert --a--.

Signed and Sealed this

Sixth Day of April, 1993

*Attest:*

STEPHEN G. KUNIN

*Attesting Officer*     Acting Commissioner of Patents and Trademarks